(12) United States Patent
Miura

(10) Patent No.: US 6,658,046 B1
(45) Date of Patent: Dec. 2, 2003

(54) SPREAD SPECTRUM RECEIVER HAVING MULTIPLE SEARCH WINDOWS TO PREVENT MISALIGNMENT DURING CALL

(75) Inventor: Tetsuya Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/394,875

(22) Filed: Sep. 13, 1999

(30) Foreign Application Priority Data

Sep. 14, 1998 (JP) .......................................... 10-259822

(51) Int. Cl.[7] .......................... H04B 1/69; H04B 1/707; H04B 1/713
(52) U.S. Cl. ...................................................... 375/148
(58) Field of Search ............................... 375/148, 340, 375/341; 370/335, 342; 455/262; 342/457, 357

(56) References Cited

U.S. PATENT DOCUMENTS

| 5,109,390 A | | 4/1992 | Gilhousen et al. .............. 375/1 |
| 5,926,503 A | * | 7/1999 | Kelton et al. ................ 375/148 |
| 6,107,959 A | * | 8/2000 | Levanon ................ 342/357.01 |

FOREIGN PATENT DOCUMENTS

| JP | 3-88526 | 4/1991 |
| JP | 4-77022 | 3/1992 |
| JP | 4-502844 | 5/1992 |
| JP | 10-22871 | 1/1998 |
| JP | 10-145326 | 5/1998 |
| JP | 11-8606 | 1/1999 |

* cited by examiner

*Primary Examiner*—Stephen Chin
*Assistant Examiner*—Curtis Odom
(74) *Attorney, Agent, or Firm*—Foley & Lardner

(57) ABSTRACT

A spread spectrum receiver includes a number of rake fingers for receiving a spread spectrum signal. Each rake finger despreads the spread spectrum signal with a despreading code. A rake combiner combines the outputs of the rake fingers. Control circuitry sets despreading codes of a first bit sequence to the rake fingers at respective timing offsets of incremental values so that there exists a timing difference of one chip interval between successive rake fingers. The control circuitry then successively varies the timing offsets in search of a call processing signal. Responsive to an output of the rake combiner indicating that the call processing signal is received, the control circuitry determines its timing offset relative to the refererence, and sets despreading codes of a second bit sequence to the rake fingers at respective timing offsets of the incremental values based on the determined timing offset to receive an information signal. If the receiver loses track of the correct timing of the information signal, the control circuitry successively varies the respective timing offsets of the rake fingers in search of the lost signal.

6 Claims, 4 Drawing Sheets

CONTROLLER

SPREAD SPECTRUM RECEIVER HAVING MULTIPLE SEARCH WINDOWS TO PREVENT MISALIGNMENT DURING CALL

BACKGROUND OF THE INVENTION

1. Field of the Invention

The present invention relates generally to spread spectrum communication systems and more specifically to a spread spectrum receiver use in a mobile communication system that can establish synchronization in a short period of time.

2. Description of the Related Art

In a spread spectrum communication system, a rake receiver is known, which consists of a plurality of rake fingers and a rake combiner that combines the outputs of the rake fingers. Each rake finger includes a despreading circuit that detects correlation between a received spread spectrum signal and a despreading code (or pseudonoise sequence) of a bit sequence identical to the despreading codes of other rake fingers. The despreading code of each rake finger is offset with respect to the reference timing of the code such that the offset values of all rake fingers are incrementally different by a chip interval. The timing offset values of all rake fingers are successively varied in search of the correct receive timing of a transmitted signal so that in one of the rake fingers the despreading code will eventually coincide with the reference timing of the transmitted signal. The process used in this timing search is a multi-window technique, which ensures a quick search.

In the conventional CDMA (code division multiple access) mobile communication systems, the multi-window technique is employed for quickly establishing timing with the control channel. However, when timing is established with the control channel, it is the usual practice to select a predetermined one of the rake fingers and to set the selected rake finger with the PN code of an assigned communication channel. The selected rake finger is then set with a timing offset value that is determined from the timing established with the control channel. Thus, when a connection is established, the selected rake finger can immediately establish synchronization with a speech signal transmitted on the assigned communication channel.

Since the multi-window mode of operation continues only for a short, call-setup time, economy can be achieved by sharing the multi-window rake receiver configuration among calls and assigning single-window despreading circuits to individual calls. However, if the receiver loses track of the correct timing, it initiates a hunt for the lost signal using the single search window. Such a misalignment condition can occur if the mobile station rapidly moves around or if the field strength of the speech signal sharply drops as a result of fading. Be cause of the single window se arch, it takes a long time to re-establish synchronization.

SUMMARY OF THE INVENTION

It is therefore an object of the present invention to provide a receiver and method for receiving a spread spectrum signal that prevents timing misalignment during a call.

According to a first aspect of the present invention, there is provided a spread spectrum receiver comprising a plurality of rake fingers for receiving a spread spectrum signal, each rake finger including despreading circuitry for despreading the spread spectrum signal with a despreading code, a rake combiner for combining output signals of the rake fingers, and control circuitry. The control circuitry has the functions of setting despreading codes of a first bit sequence to the rake fingers at respective timing offsets of incremental values so that there exists a timing difference of one chip interval between successive rake fingers, and successively varying the respective timing offsets to receive a call processing signal. Responsive to an output of the rake combiner indicating that the call processing signal is received, the control circuitry determines the timing offset of the received call processing signal, and sets despreading codes of a second bit sequence to the rake fingers at respective timing offsets based on the determined timing offset in order to receive an information signal. The control circuitry may be arranged to successively vary the respective timing offsets o f the despreading codes of the second bit sequence in response to an output of the rake comb iner indicating that the information signal is lost.

According to a second aspect, the present invention provides a spread spectrum receiver comprising a plurality of rake fingers for receiving a spread spectrum signal, and a rake combiner for combining output signals of the rake fingers. Each rake finger includes a plurality of despreading circuitry for despreading the spread spectrum signal with a plurality of despreading codes of identical bit sequence, a plurality of signal-to-interference detecting circuitry associated respectively with the plurality of despreading circuitry for determining the respective signal-to-interference ratios of output signals of the plurality of despreading circuitry, and selecting circuitry for selecting one of the output signals of the despreading circuitry having a maximum signal-to-interference ratio as an output signal of the rake finger. Control circuitry has the functions of setting despreading codes of a first bit sequence to all despreading circuitry of all rake fingers at respective timing offsets of incremental values so that there exists a timing difference of one chip interval between successive ones of all despreading circuitry, and successively varying the respective timing offsets of all rake fingers to receive a call processing signal. The control circuitry is responsive to an output of the rake combiner, indicating that the call processing signal is received, for determining a timing offset of the received call processing signal, and setting despreading codes of a second bit sequence at respective timing offsets to all despreading circuitry of all rake fingers based on the determined timing offset to receive an information signal. The control circuitry may be arranged to successively vary the respective timing offsets of the despreading codes of the second bit sequence set in the despreading circuitry of all rake fingers in response to an output of the rake combiner indicating that the information signal is not received.

According to a third aspect, the present invention provides a method of receiving a spread spectrum signal by using a plurality of rake fingers and a rake combiner, wherein each of the rake fingers receives a spread spectrum signal and despread the spread spectrum signal with a despreading code of identical bit sequence, and the rake combiner combines outputs of the rake fingers. The method comprises the steps of setting despreading codes of a first bit sequence to the rake fingers at respective timing offsets of incremental values so that there exists a timing difference of one chip interval between successive rake fingers, successively varying the timing offsets of the despreading codes, determining a timing offset in response to an output of the rake combiner indicating that a call processing signal is received, and setting despreading codes of a second bit sequence to the rake fingers at respective timing offsets of incremental values based on the determined timing offset to receive an information signal.

According to a fourth aspect, the present invention provides a method of receiving a spread spectrum signal by using a plurality of rake fingers for receiving a spread spectrum signal, and a rake combiner, wherein each rake finger includes a plurality of despreading circuitry for despreading the spread spectrum signal with a plurality of despreading codes of identical bit sequence, a plurality of signal-to-interference detecting circuitry associated respectively with the plurality of despreading circuitry for determining the respective signal-to-interference ratios of output signals of the despreading circuitry, and selecting circuitry for selecting one of the output signals of the despreading circuitry having a maximum signal-to-interference ratio, wherein the rake combiner combines the selected signals of the rake fingers. The method comprises the steps of setting despreading codes of a first bit sequence to all despreading circuitry of all rake fingers at respective timing offsets of incremental values so that there exists a timing difference of one chip interval between successive ones of all despreading circuitry, successively varying the respective timing offsets of all rake fingers to receive a call processing signal, determining a timing offset in response to an output of the rake combiner indicating that the call processing signal is received, and setting despreading codes of a second bit sequence to all despreading circuitry of all rake fingers at respective timing offsets of incremental values based on the determined timing offset to receive an information signal.

BRIEF DESCRIPTION OF THE DRAWINGS

The present invention will be described in further detail with reference to the accompanying drawings, in which.

DETAILED DESCRIPTION

Figure 1:
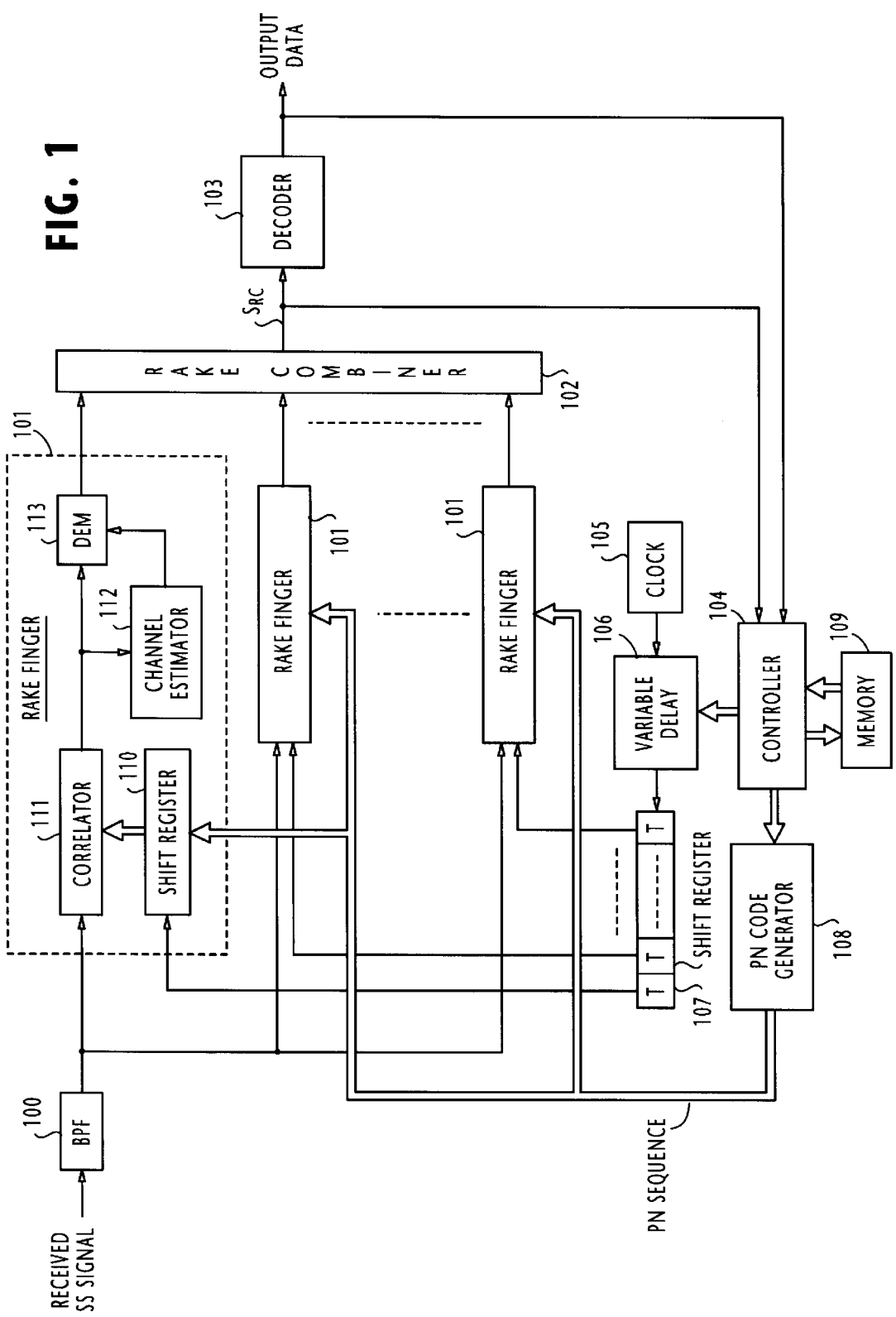
FIG. 1 is a block diagram of a spread spectrum receiver according to one embodiment of the present invention.

Referring now to FIG. 1, there is shown a spread spectrum receiver of a first embodiment of this invention for a CDMA (code division multiple access) cellular mobile communication system. The receiver includes a bandpass filter 100 for bandlimitting a received spread spectrum RF (radio frequency) signal. A number of rake fingers 101 are provided respectively for different channels to establish respective search windows. Rake fingers 101 receive their signals from the output of the bandpass filter 100 and their outputs are combined in a rake combiner 102. The rake-combined signal is coupled to a decoder 103 which makes a decision on the rake-combined signal to recover the original digital signal.

A controller 104 is provided to operate in response to the outputs of rake combiner 102 and decoder 103. A clock source 105 supplies a sequence, of clock pulses at chip intervals T through a variable delay circuit 106 to a shift register 107 where the pulses are shifted along its stages. The stages of shift register 107 are coupled to the rake fingers 101, respectively. Variable delay circuit 106 introduces a predetermined amount of delay time (i.e., T). A pseudonoise (PN) code generator 108 produces a PN code according to a command signal from the controller 104.

In each rake finger, a shift register 110 of recirculating type is provided for receiving the PN code and successively shifts it along its stages in response to the clock pulses supplied from the corresponding stage of shift register 107. The PN code sequence shifted out of the shift register is recirculated through a feedback path and entered again through its input end. The recirculating process is repeated until the stored PN code is replaced with a new PN code. In this way, the offset timing of the stored PN code is successively varied with respect to the reference timing.

In each rake finger, correlation between the band-limited spread spectrum signal and the stored PN code is calculated by a correlator 111 for despreading the spread spectrum signal. The result of correlation is used by a channel estimator 112 which may be implemented with an adaptive transversal filter to estimate the characteristic of the channel of the received spread spectrum signal. A demodulator 113 is provided for demodulating the received signal.

The base station is constantly broadcasting a timing signal on a control channel. Mobile stations in the cell are monitoring this control channel. When a mobile station wishes to set up a call, it sends a spread spectrum call request signal on the control channel at a timing based on the timing signal of the control channel.

Figure 2:
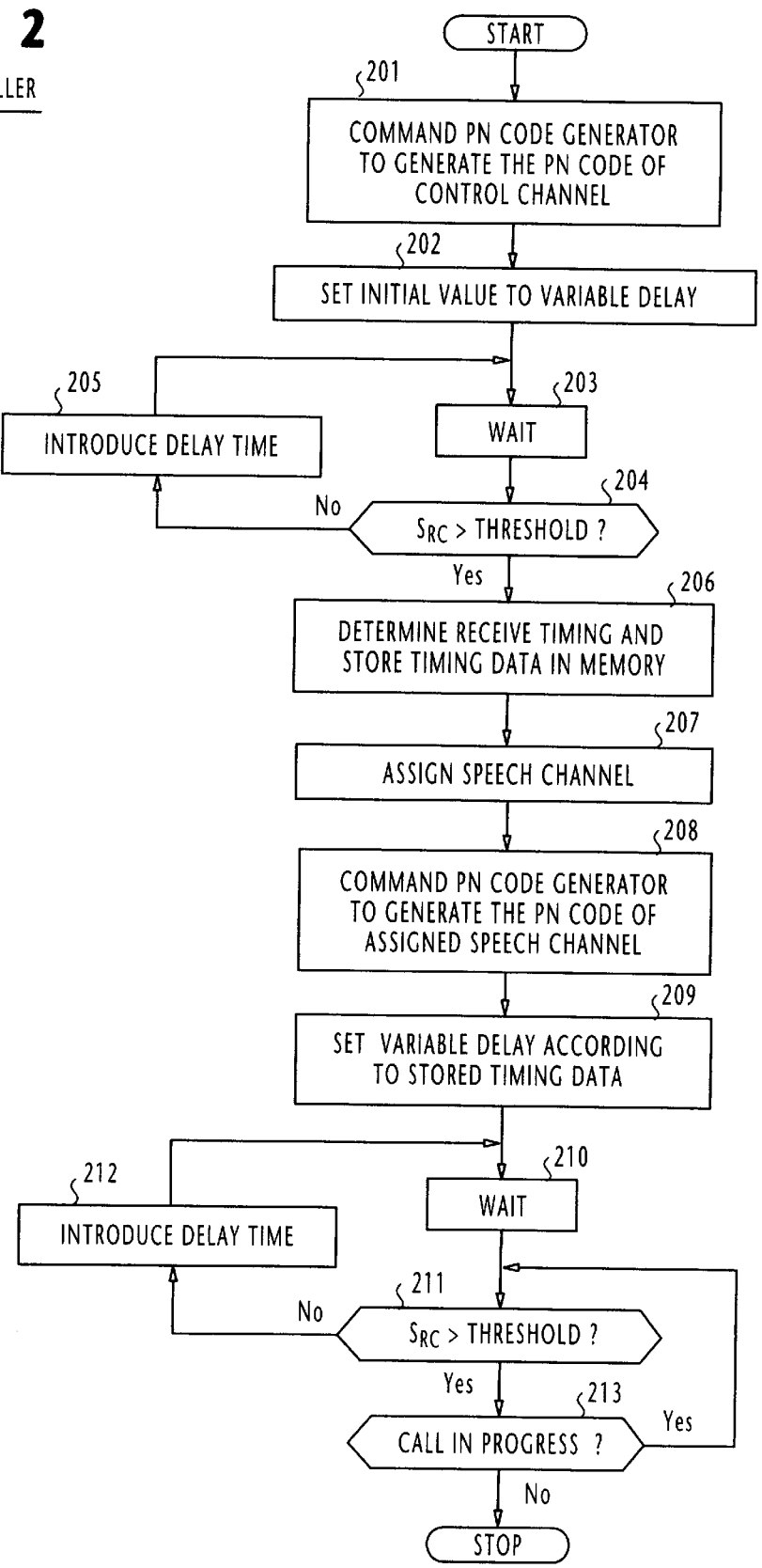
FIG. 2 is a flowchart of the operation of the timing controller of FIG. 1.

The operation of the controller 104 proceeds according to the flowchart of FIG. 2, starting with step 201 where the controller commands the PN code generator 108 to produce the PN code of the control channel and sets initial timing data to the variable delay circuit 106 so that the center stage of the shift register 107 corresponds to the reference timing of the PN code (step 202). Therefore, one half of the shift register 107 to the left are delayed with respect to the reference timing and one half to the right are advanced with respect to the reference timing. In this way, the despreading codes of all rake fingers are set at respective timing offsets of incremental values so that there exists a timing difference of one chip interval between successive rake fingers.

Controller 104 proceeds to step 203 to wait a predetermined interval and proceeds to step 204 to determine if the output signal SRC of the rake combiner 102 is higher than a threshold. If not, the routine proceeds from step 204 to step 205 to cause the variable delay circuit 106 to introduce a preselected delay time to the sequence of chip-rate clock pulses. The routine returns from step 205 to step 203 to wait the predetermined interval. Thus, the routine loops steps 203, 204 and 205 until the threshold is exceeded. This occurs when the reference timing coincides with the possible receive timing of the mobile-transmitted signal.

Figure 3:
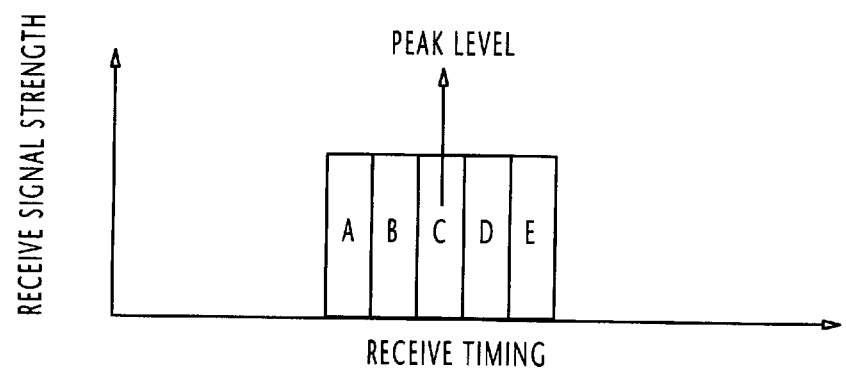
FIG. 3 is an illustration of search windows of the first embodiment of this invention.

If there are five rake fingers, the receive timing of the mobile-transmitted call request signal will be within the range of five search windows A, B, C, D and E as shown in FIG. 3, and correct timing can be quickly determined. When the rake-combined signal SRC exceeds the threshold, it is determined that the mobile-transmitted call request signal is received. When this occurs, the decoder 103 supplies a signal to the controller 104, indicating that a call request signal is received.

In response, the controller 104 proceeds from step 204 to step 206 to determine the offset of receive timing of the mobile-transmitted signal with respect to the reference timing of the PN code and stores the timing offset data into a memory 109.

At step 207, the controller 104 processes the call setup signal and assigns a speech channel to the requesting user. When a speech channel is assigned, the routine proceeds to step 208 to command the PN code generator 108 to supply the PN code of the assigned speech channel to the rake fingers 101.

At step 209, the controller 104 sets the variable delay circuit 106 according to the receive timing data stored in the memory 109.

Controller 104 then proceeds to step 210 to wait a predetermined interval and determines if the rake combiner output SRC is higher than the threshold (step 211). If not, the variable delay circuit 106 is commanded to introduce a preselected delay time to the sequence of chip-rate clock pulses (step 212). The routine returns from step 212 to step 210 to wait the predetermined interval again. Thus, steps 210, 211 and 212 will be repeated if there is a timing offset between the set timing and the actual timing of the received signal.

Since the variable delay circuit 106 is set to the previous receive timing of the call setup signal and a simultaneous search is conducted on multiple windows, the information signal will be detected immediately following the call setup procedure. Therefore, the rake-combined signal will usually exceed the threshold quickly after the communication channel was assigned.

Therefore, even if the receive timing of the mobile-transmitted signal varies significantly immediately following the call setup procedure due to the mobile station rapidly moving around or due to the occurrence of a significant fluctuation in the propagation environment, the receive timing will still be within the range of the multiple search windows at the base station. Therefore, in most cases, sync acquisition is not necessary for the duration of a call.

If the receive timing of the mobile-transmitted signal should go out of the range of multiple search windows, an acquisition procedure must be initiated. For this purpose, the routine proceeds from step 211 to step 213 to check to see if the call is still in progress. If so, the routine returns from step 213 to step 211 to check to see if the rake-combined signal is higher than the threshold. If such an out-of-range condition occurs, the decision at step 211 will be negative, and the routine repeatedly executes step 212 so that the multiple windows are shifted a predetermined amount to move the search windows sideways in order to detect the lost signal.

According to the prior art, the time taken to search for the correct receive timing is usually in the range of several frames to several tens of frames (the frame is of 10-mto 20-ms duration). Whereas, the search time of the present invention is usually substantially zero.

Figure 4:
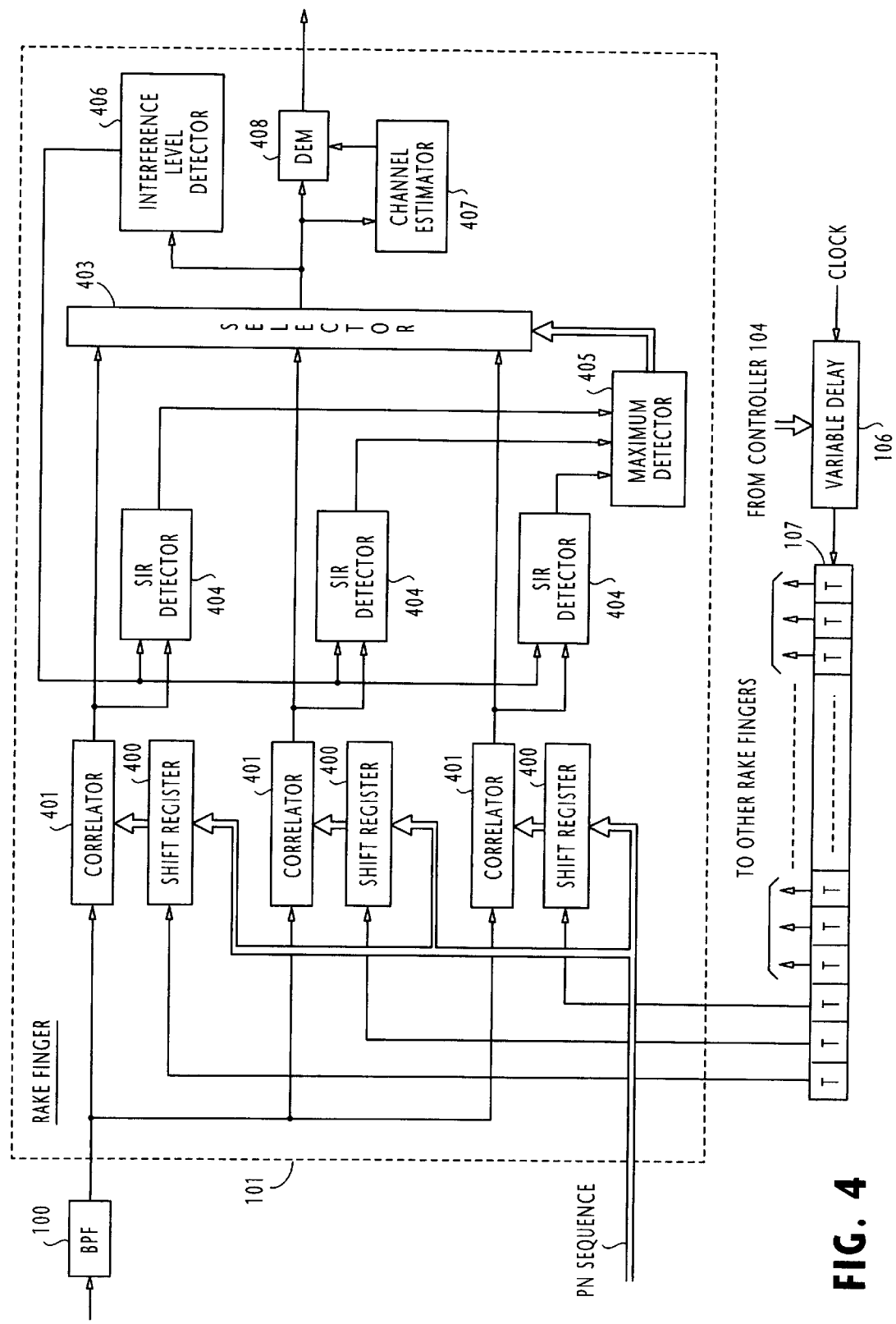
FIG. 4 is a block diagram of a spread spectrum receiver according to a modified embodiment of the present invention.

A modified embodiment of the present invention is shown in FIG. 4. According to this modification, each rake finger is comprised by a set of shift registers 400 and a corresponding set of correlators 401. Shift registers 400 receive their timing signals from successive stages of the shift register 107 and a PN code from the PN code generator 108 so that these PN codes are shifted in the registers 400 at different timing. Correlations between the input spread spectrum signal and the PN codes are taken respectively by the correlators 401 and their outputs are coupled to a selector 403 and further to a set of SIR (signal-to-interference ratio) detectors 404. The outputs of SIR detectors 404 are compared with each other and the maximum of these is determined by a maximum detector 405. Selector 403 is controlled by the maximum detector 405 to select one of the outputs of SIR detectors 404 that is specified by the maximum detector as having the maximum SIR value.

An interference level detector 406 is connected to the output of the selector 403 to detect the interference level of the selected signal. The output of the interference level detector 406 is used by the SIR detectors 403 to determine their SIR value. The output of selector 403 is further connected to a channel estimator 407 and a demodulator 408 in the same manner as that shown in FIG. 1.

Figure 5:
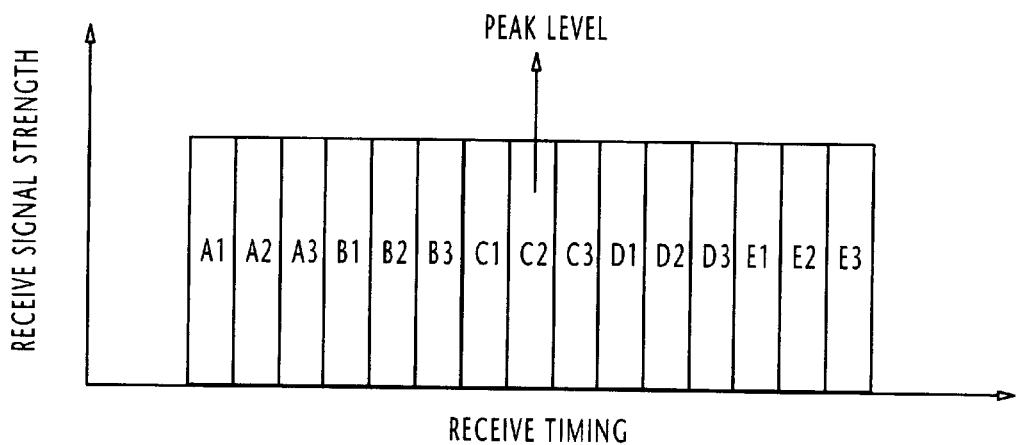
FIG. 5 is an illustration of search windows of the modified embodiment of this invention.

It is seen therefore that each rake finger has a set of three search windows. If five rake fingers are provided, there is a total of fifteen search windows as shown in FIG. 5.

The provision of the SIR-dependent selection circuitry in each rake finger allows the spread spectrum receiver to increase its search windows without increasing implementation costs associated with the channel estimator 407 and demodulator 408. If the number of rake fingers is simply increased, the implementation cost of the spread spectrum receiver would increase in proportion.

What is claimed is:

1. A spread spectrum receiver comprising:

a plurality of rake fingers for receiving a spread spectrum signal, each rake finger including despreading circuitry for despreading the spread spectrum signal with a despreading code of an identical bit sequence;

a rake combiner for combining output signals of said rake fingers; and control circuitry for setting despreading codes of a first bit sequence to said rake fingers at respective timing offsets in incremental values so that there is a timing difference of one chip interval between successive rake fingers, and successively varying said respective timing offsets to receive a call processing signal, said control circuitry being responsive to an output of said rake combiner, indicating that said call processing signal is received, for determining a timing offset of the received call processing signal, and setting despreading codes of a second bit sequence to said rake fingers at respective timing offsets of said incremental values based on the determined timing offset to receive an information signal; and wherein said control circuitry is arranged to successively vary the respective timing offsets of the despreading codes of the second bit sequence in response to an output of said rake combiner indicating that said information signal is lost.

2. A spread spectrum receiver comprising:

a plurality of rake fingers for receiving a spread spectrum signal, each rake finger including:

a plurality of despreading circuitry for despreading the spread spectrum signal with a plurality of despreading codes of identical bit sequence;

a plurality of signal-to-interference detecting circuitry associated respectively with said plurality of despreading circuitry for determining the respective signal-to-interference ratios of output signals of said plurality of despreading circuitry; and selecting circuitry for selecting one of the output signals of said despreading circuitry having a maximum signal-to-interference ratio as an output signal of the rake finger;

a rake combiner for combining the output signals of said rake fingers; and control circuitry for setting despreading codes of a first bit sequence to all despreading circuitry of all rake fingers at respective timing offsets of incremental values so that there is a timing difference of one chip interval between successive ones of all despreading circuitry to receive a call processing signal, and successively varying said respective timing offsets of all rake fingers, said control circuitry being responsive to an output of said rake combiner, indicating that said call processing signal is received, for determining a timing offset of the received call processing signal, and setting despreading codes of a second bit sequence at respective timing offsets of said incremental values to all despreading circuitry of all rake fingers based on the determined timing offset to receive an information signal.

3. A spread spectrum receiver as claimed in claim 2, wherein said control circuitry is arranged to successively vary the respective timing offsets of the despreading codes of the second bit sequence in response to an output of said rake combiner indicating that said information signal is lost.

4. A method of receiving a spread spectrum signal by using a plurality of rake fingers and a rake combiner, wherein each of the rake fingers receives a spread spectrum signal and despreads the spread spectrum signal with a despreading code of identical bit sequence, and said rake combiner combines outputs of said rake fingers, the method comprising the steps of:

setting despreading codes of a first bit sequence to said rake fingers at respective timing offsets of incremental values so that there exists a timing difference of one chip interval between successive rake fingers;

successively varying the timing offsets of the despreading codes;

responsive to an output of said rake combiner indicating that a call processing signal is received, determining a timing offset of the received call processing signal;

setting despreading codes of a second bit sequence to said rake fingers at respective timing offsets of said incremental values based on the determined timing offset to receive an information signal; and successively varying the respective timing offsets of the despreading codes of the second bit sequence in response to an output of said rake combiner indicating that said information signal is lost.

5. A method of receiving a spread spectrum signal by using a plurality of rake fingers for receiving a spread spectrum signal, and a rake combiner, wherein each rake finger includes a plurality of despreading circuitry for despreading the spread spectrum signal with a plurality of despreading codes of identical bit sequence, a plurality of signal-to-interference detecting circuitry associated respectively with said plurality of despreading circuitry for determining the respective sign al-to-interference ratios of output signals of said despreading circuitry, and selecting circuitry for selecting one of the output signals of the despreading circuitry having a maximum signal-to-interference ratio as an output signal of the rake finger, wherein said rake combiner combines the output signals of said rake fingers, the method comprising the steps of:

setting despreading codes of a first bit sequence to all despreading circuitry of all rake fingers at respective timing offsets of incremental values so that there exists a timing difference of one chip interval between successive ones of all despreading circuitry;

successively varying said respective timing offsets in search of a call processing signal;

responsive to an output of said rake combiner indicating that the call processing signal is received, determining a timing offset of the received call processing signal; and setting despreading codes of a second bit sequence to all despreading circuitry of all rake fingers at respective timing offsets of said incremental values based on the determined timing offset to receive an information signal.

6. A method as claimed in claim 5, further comprising the step of successively varying the respective timing offsets of the despreading codes of the second bit sequence in response to an output of said rake combiner indicating that said information signal is lost.

* * * * *